D. H. Thompson.
Hay Loader.

Nº 14538. Patented Mar. 25, 1856.

UNITED STATES PATENT OFFICE.

D. H. THOMPSON, OF FITCHBURG, MASSACHUSETTS.

IMPROVEMENT IN MACHINES FOR RAKING AND LOADING HAY.

Specification forming part of Letters Patent No. 14,538, dated March 25, 1856.

*To all whom it may concern:*

Be it known that I, D. H. THOMPSON, of Fitchburg, in the county of Worcester and State of Massachusetts, have invented a new and Improved Self-Loading Hay Wagon or Cart; and I do hereby declare that the following is a full, clear, and exact description of the same, reference being had to the annexed drawings, making a part of this specification, in which—

Figure 1:
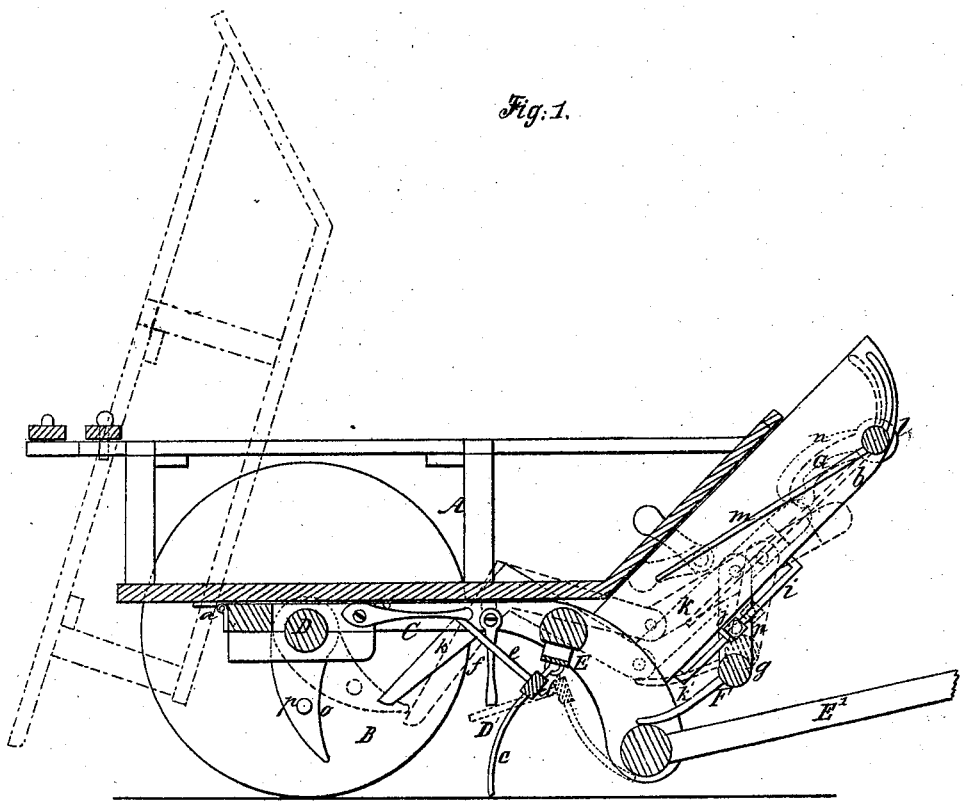
Figure 2:
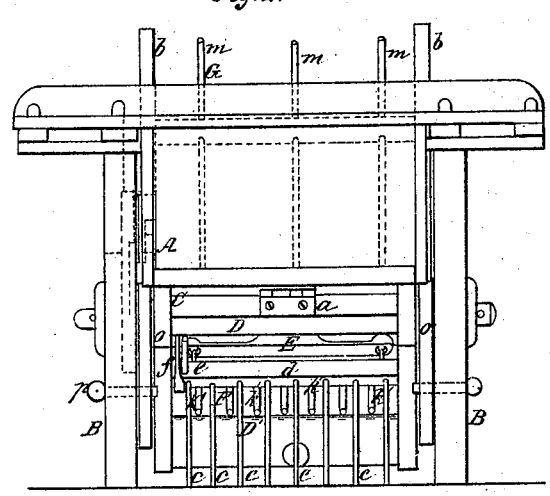

Figure 1 is a longitudinal vertical section of my improvement. Fig. 2 is a back view of the same.

Similar letters of reference indicate corresponding parts in the two figures.

My invention consists in the employment or use of rakes and levers constructed, arranged, and applied to a cart or wagon, as will be presently shown and described, and operating in such a way that the hay, straw, or other material will be raked and deposited in the cart or wagon as it is drawn along.

To enable those skilled in the art to fully understand and construct my invention, I will proceed to describe it.

A represents the body of a cart or wagon, supported by wheels B in the usual way, the body being so arranged as to tilt by attaching it to the framing or bed C by hinges or hooks $a$, which framing or bed is attached to the axle D. The front end of the framing or bed C is curved downward and nearly reaches the ground, and the draft-pole or tongue E′ is attached to the center of the front cross-piece of the framing or bed, as shown in Fig. 1.

To the front end of the framing or bed C there are attached two inclined strips or planks, $b\ b$, one at each side of the framing or bed. The front end of the body A rests against the back edges of these strips or planks.

D′ represents a rake, the teeth $c$ of which are curved. The head or bar $d$, to which the teeth are attached, is jointed or hinged to a spring, E, which is attached to the under side of the front end of the body A, and the head or bar $d$ of the rake has a rod, $e$, attached to its back side, which rod bears against a spring, $f$, attached to the framing or bed A.

F is a rake, the head $g$ of which is attached at each end to an arm, $h$. These arms slide upon guide-rods $i$, which are attached to the front edges of the strips or planks $b\ b$. The arms $h$ have each a swivel-eye, $j$, attached to them at the rods $i$, passing through the eyes. The upper end of each arm $h$ is connected to a series of levers, $k$, at each side of the framing or bed C. The teeth $k'$ of the rake F are curved inward, as shown in Fig. 1.

Between the upper ends of the strips or planks $b\ b$ there is secured a rake, G, the head $l$ of which is allowed to turn freely in the strips or planks. The teeth $m$ of the rake G extend downward some distance between the strips or planks $b\ b$.

To one end of the head $l$ of the rake G there is attached an arm, $n$, the end of which rests upon the upper end of the outer lever $k$ at one side of the framing or bed C.

To the inner side of each wheel B there is attached a cam or projection, $o$, as shown in both figures. These cams or projections are placed on the axle D, and are secured to the wheels, so as to turn with them, by pins $p$.

Operation: As the machine is drawn along the rake D′ is forced backward by the resistance offered to it by the hay, straw, or other material, the resistance of the spring $f$ being overcome, and when said rake D′ is filled the driver backs the team, so that the rake will be thrown forward, as shown by dotted lines in Fig. 1. When the rake D′ is thrown forward the cams or projections $o$ on the inner sides of the wheels B will act upon the inner levers $k$, and the teeth $k'$ of the rake F will be turned inward and grasp the hay or other material brought forward by the rake D′, and the rake F will be raised by the levers $k$, and the hay or other material will be brought between the teeth $m$ of the rake G and the front end of the body A. When the cams or projections $o$ pass the inner levers $k$ the upper end of the lever $k$, at one side of the framing or bed C, will so act upon the arm $n$ as to force the teeth $m$ of the rake G inward and cause said rake to hold the hay or other material, and when a succeeding quantity of hay is brought or carried upward by the rake F the previous quantity will be forced over the front end of the body A and within the body, it being understood that when the rake F rises the teeth $m$ of the rake G turn or move outward by their own gravity, the arm $n$ being then free from the outer lever $k$, in order to receive the hay or other material brought up by the rake F.

By the above implement hay may be raked in cocks by merely tilting the body A.

Having thus described my invention, what I claim as new, and desire to secure by Letters Patent, is—

The combination of levers $k$ with rakes F and G, when operated substantially as shown, for the purpose specified.

D. H. THOMPSON.

Witnesses:
  T. K. WARE,
  A. H. ANDREWS.